United States Patent
Gluch et al.

(10) Patent No.: US 6,847,177 B1
(45) Date of Patent: Jan. 25, 2005

(54) APPARATUS AND METHOD FOR DETERMINING ROTOR LAMINATION SHIFTS IN AN ELECTRIC MOTOR

(75) Inventors: Mark W. Gluch, Grosse Ile, MI (US); Joseph D. Miller, Farmington Hills, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 10/648,073

(22) Filed: Aug. 26, 2003

(51) Int. Cl.[7] .............................................. H02K 23/00
(52) U.S. Cl. ..................... 318/254; 318/138; 318/439; 318/569; 318/567
(58) Field of Search ................................ 318/254, 138, 318/439, 569, 567

(56) References Cited

U.S. PATENT DOCUMENTS

| 5,625,239 | A | 4/1997 | Persson et al. |
|---|---|---|---|
| 5,661,381 | A | 8/1997 | Blackburn |
| 5,796,237 | A | 8/1998 | Yamakawa |
| 5,796,248 | A | 8/1998 | Weber |
| 2003/0020421 | A1 * | 1/2003 | Vu et al. .................... 318/442 |
| 2003/0128026 | A1 * | 7/2003 | Lutz ......................... 324/207.2 |

* cited by examiner

*Primary Examiner*—Karen Masih
(74) *Attorney, Agent, or Firm*—Tarolli, Sundheim, Covell & Tummino L.L.P.

(57) ABSTRACT

An apparatus and method of controlling an electric motor (26) having a rotor (34) that is formed from a series of laminations (48) and has a plurality of rotor poles (36) and a stator (30) that encircles the rotor (34) and has a plurality of stator poles (32), each with a respective stator winding (38). A first sensor (46) senses actual inductance in the respective stator winding (38). A second sensor (46) senses a position of the rotor (34) relative to the stator (30). A controller (42) determines a reference inductance based on the rotor position signal, determines a difference between the actual inductance and the reference inductance, and prevents further energization of the stator windings (38) when the difference exceeds a predetermined amount.

8 Claims, 3 Drawing Sheets

APPARATUS AND METHOD FOR DETERMINING ROTOR LAMINATION SHIFTS IN AN ELECTRIC MOTOR

TECHNICAL FIELD

The present invention relates to an apparatus and a method for determining rotor lamination shifts in an electric motor.

BACKGROUND OF THE INVENTION

An electric motor includes a rotor and a stator. The rotor is rotatable relative to the stator. The rotor includes a plurality of outwardly extending rotor poles. The rotor is mounted on and is coaxial with a rotor shaft. Generally, the rotor is formed from a plurality of laminations that are secured together.

The stator encircles the rotor and is coaxial with both the rotor and the rotor shaft. The stator includes a plurality of inwardly extending stator poles. The number of stator poles differs from the number of rotor poles. Each stator pole has a winding that is energizable for causing the rotor to rotate relative to the stator.

The windings of the stator are systematically energized to cause the rotor to rotate in a particular direction. Typically, when a respective stator winding is energized, the rotor pole that is nearest to the respective stator winding is drawn toward that stator winding. Thus, by systematically energizing the respective stator windings, the rotor can be caused to rotate in a particular direction relative to the stator.

It is possible for the laminations of the rotor to shift relative to each other. For example, a group of laminations of the motor rotor may shift relative to the remainder of the laminations. As a result, the rotor poles become bifurcated into two axially extending sections that are misaligned angularly from one another. This angular misalignment of portions of the rotor poles will adversely affect motor operation and may, in an extreme case, cause the rotor to rotate in a direction opposite to the intended direction of rotation when the respective stator winding is energized. For example, suppose the rotor pole nearest a respective stator winding is to the left of the respective stator winding. During normal motor operation, the rotor pole rotates to the right upon energization of the respective stator winding. If a group of rotor laminations has shifted relative to the remainder of the rotor laminations and the shifted laminations are located nearer the respective stator winding but to the right of the respective stator winding, upon energization of the respective stator winding the rotor may rotate to the right at a speed slower than expected, may not be rotated at all, or may rotate to the left relative to the respective stator winding. The movement of the rotor relative to the respective stator winding is dependent upon the number and extent to shifted laminations in the rotor. In each of the above scenarios, the motor is malfunctioning.

Such motor malfunction, and in particular the rotation of the rotor in a direction opposite to the intended direction of rotation, may be disconcerting when the electric motor is used in an electric power-assisted steering system of a vehicle. If the rotor rotates in a direction opposite to the intended direction of rotation in an electric power-assisted steering system, the vehicle may turn in a direction opposite to the direction intended by the driver. For example, the driver may rotate the steering wheel in a direction to turn the vehicle to the right and the power assistance from the electric motor may cause the vehicle to turn to the left.

Thus, a need exists for an apparatus to detect a shift of rotor laminations and to prevent the energization of the electric motor if a rotor lamination shift is determined.

SUMMARY OF THE INVENTION

The present invention relates to an apparatus comprising an electric motor, a first sensor, a second sensor, and a controller. The electric motor has a rotor that is rotatable relative to a stator. The rotor is formed from a series of laminations and has a plurality of rotor poles. The stator encircles the rotor and has a plurality of stator poles. Each stator pole has a winding that is energizable to cause rotation of the rotor relative to the stator. The first sensor senses actual inductance in a respective stator winding and provides a signal indicative of the actual inductance. The second sensor senses a position of the rotor relative to the stator and provides a rotor position signal. The controller receives the rotor position signal and the actual inductance signal. The controller determines a reference inductance for the respective stator winding based on the rotor position signal, determines a difference between the actual inductance and the reference inductance, and prevents the energization of the stator windings when the difference between the actual inductance and reference inductance exceeds a predetermined amount.

The present invention also relates to a method of controlling an electric motor having a rotor that is formed from a series of laminations and that has a plurality of rotor poles and having a stator that encircles the rotor and that has a plurality of stator poles. The method comprises the steps of sequentially energizing stator windings associated with each stator pole of the plurality of stator poles to cause the rotor to rotate relative to the stator; sensing actual inductance in a respective stator winding; sensing a position of the rotor relative to the stator; determining a reference inductance for the respective stator winding based on the sensed rotor position; determining a difference between the actual inductance and the reference inductance; and preventing further energization of the stator windings when the difference between the actual inductance and reference inductance exceeds a predetermined amount.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENT

Figure 1:
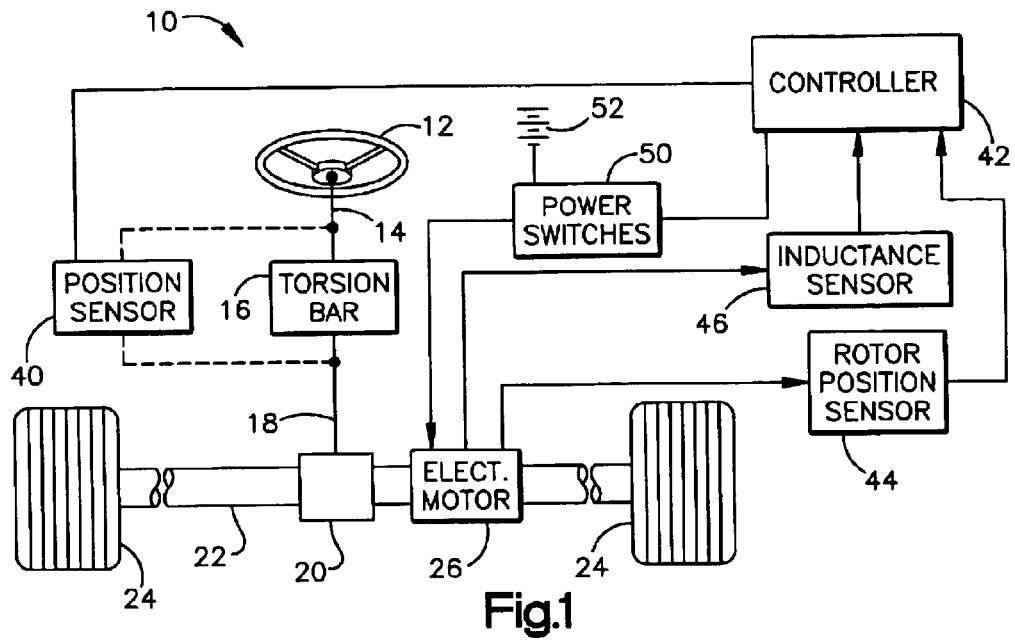
FIG. 1 is a diagrammatic representation of an electric power-assisted steering system embodying the present invention.

Referring to FIG. 1, an electric power-assist steering system 10 includes a steering wheel 12 that is rotatable by a vehicle occupant. The steering wheel 12 is attached to an end of an input shaft 14. An opposite end of the input shaft 14 is connected to a torsion bar 16. The torsion bar 16 couples the input shaft 14 to an output shaft 18. The torsion bar 16 twists in response to the applied steering torque to permit relative rotation between the input shaft 14 and the output shaft 18. Stops (not shown) may be included to limit the amount of relative rotation between the input and output shafts 14 and 18. An end of the output shaft 18 opposite to the torsion bar 16 connects to a pinion gear 20.

The pinion gear 20 has a plurality of teeth (not shown) that engage corresponding teeth (not shown) on a rack 22. The rack 22 connects to the vehicle's steerable wheels 24 in a known manner. When the steering wheel 12 is rotated, rotary motion of the pinion gear 20 is converted into linear motion of the rack 22. When the rack 22 moves linearly, the steerable wheels 24 pivot about their associated steering axes and the vehicle is steered.

An electric motor 26 is drivingly connected to the rack 22. An exemplary electric motor 26 is the variable reluctance motor schematically illustrated in FIG. 2. Generally, a rotor shaft 28 of the variable reluctance electric motor 26 is connected to a ballnut (not shown) of the electric power-assist steering system 10. Rotation of the ballnut causes linear movement of the rack 22 and turning of the steerable wheels 24. The variable reluctance electric motor 26 is desirable for use in an electric power-assisted steering system 10 because of its small size, low friction, and high torque-to-inertia ratio.

Figure 2:
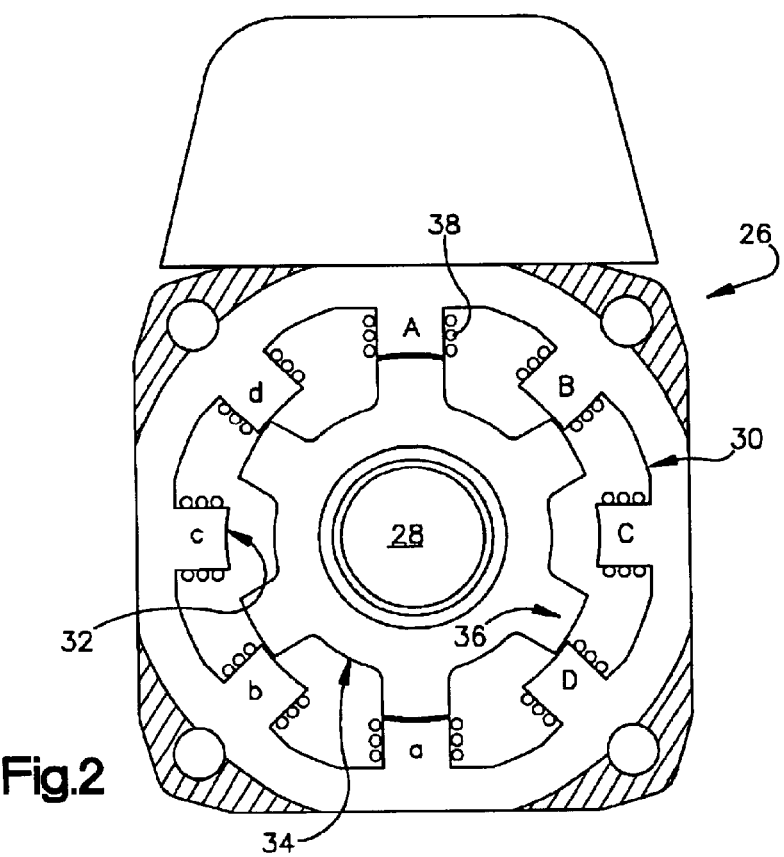
FIG. 2 is a schematic cross-sectional view of an exemplary variable reluctance electric motor.
Figure 3:
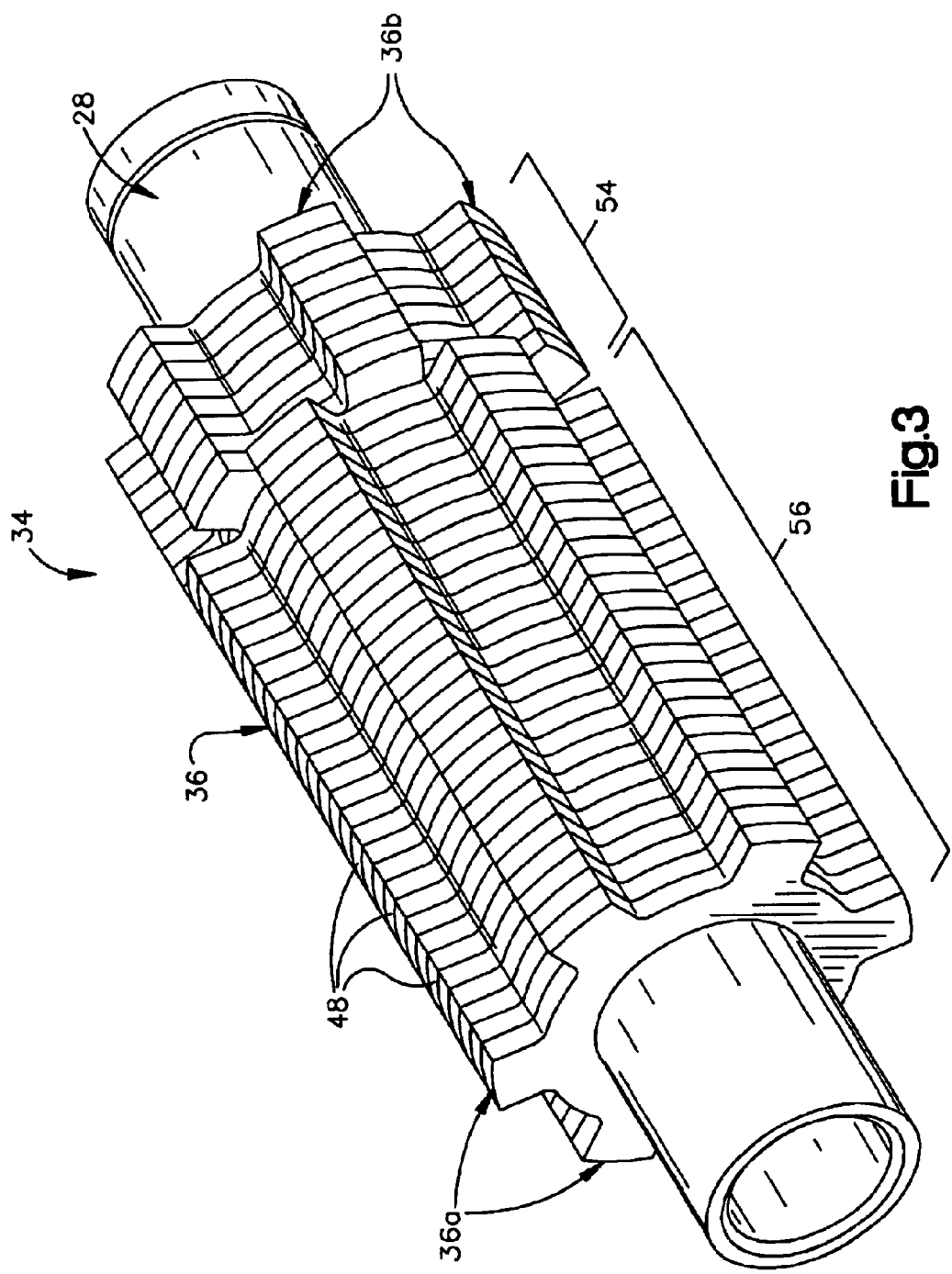
FIG. 3 is a view of a rotor of the variable reluctance electric motor of FIG. 2 having a group of laminations shifted relative to the remainder of the lamination.

In the exemplary embodiment illustrated in FIG. 2, the variable reluctance electric motor 26 includes a stator 30 with eight stator poles, generally indicated at 32. The eight stator poles are individually referenced A, B, C, D, a, b, c, and d. The variable reluctance electric motor 26 also includes a rotor 34 formed from a series of laminations 48 (FIG. 3). As illustrated, the rotor 34 includes six rotor poles, indicated generally at 36. The number of stator poles 32 and rotor poles 36 may be changed to any even number of poles, as long as the number of stator poles 32 differs from the number of rotor poles 36.

Each stator pole 32 has an associated stator winding, indicated generally at 38. When electric current flows through the stator windings 38, the stator pole 32 associated with the stator winding 38 becomes energized. The stator windings 38 are energized in pairs to energize pairs of stator poles 32. The pairs of stator poles are designated Aa, Bb, Cc, and Dd.

The principle of operation of a variable reluctance electric motor 26 is well known in the art. The stator poles 32 are energized in pairs Aa, Bb, Cc, or Dd. Specifically, an electric current is provided to the stator windings 38 associated with a given pair Aa, Bb, Cc, or Dd of stator poles 32. The stator windings 38 within each pair Aa, Bb, Cc, and Dd are wound so that when energized, depending on the direction of current flow through the associated stator windings 38, one stator pole 32 of the pair becomes a magnetic north pole and the other stator pole 32 of the pair becomes a magnetic south pole. Magnetic flux passes from the magnetic north pole of the stator 30, through the rotor 34, to the magnetic south pole of the stator 30. As a result, the rotor 34 moves to a position to minimize the reluctance between the energized stator poles 32, i.e., the magnetic north and south poles of the stator 30, and the rotor poles 36.

Minimum reluctance occurs when a pair of rotor poles 36 is aligned with the pair of energized stator poles 32. Once minimum reluctance is achieved, the energized stator poles 32 are de-energized and an adjacent pair of stator poles 32 becomes energized. The direction of rotation of the rotor 34 is controlled by the sequence in which the stator poles 32 are energized. For example, with reference to FIG. 2, to rotate the rotor 34 in a counter-clockwise direction, the stator poles 32 are energized in the following order: Bb, Cc, Dd, Aa, and so on. To rotate the rotor 34 of FIG. 2 in a clockwise direction, the stator poles 32 are energized in the following order: Dd, Cc, Bb, Aa, and so on.

The variable reluctance electric motor 26 becomes energized when the vehicle steering wheel 12 is rotated and the torsion bar 16 is subjected to a predetermined amount of torque. The amount and direction of the torque on the torsion bar 16 may be determined using a position sensor 40 such as a Hall effect device. The position sensor 40 provides a signal representative of the amount and direction of the torque applied to the torsion bar 16 to a controller 42. The controller 42 determines if power assistance should be utilized to aid in the turning of the steerable wheels 24 of the vehicle. If the controller 42 determines that power assistance is appropriate, the variable reluctance electric motor 26 is energized and the rotor 34 is rotated in an appropriate direction to aid in the turning of the steerable wheels 24.

As shown in FIG. 1, a sensor 44 for sensing the position of the rotor 34 relative to the stator 30 is connected to the variable reluctance electric motor 26. In the preferred embodiment, the sensor 44 is a Hall effect device. Any sensor for determining the position of the rotor 34 relative to the stator 30, other than an inductance sensor, may be used. As will become clear with further reading of this description, an inductance sensor is not appropriate for determining the position of the rotor 34 relative to the stator 30 in accordance with the present invention. The sensor 44 senses the position of the rotor 34 relative to the stator 30 and provides a signal indicative of the rotor position to the controller 42.

As shown in FIG. 1, an inductance sensor 46, in addition to sensor 44, also connects to the variable reluctance electric motor 26. The inductance sensor 46 senses inductance in the stator windings 38 of the variable reluctance electric motor 26. In the preferred embodiment, the inductance sensor 46 senses inductance in all of the stator windings 38 in the variable reluctance electric motor 26.

Inductance is a property of a coil or winding that causes voltages to be induced in a direction such that resulting currents oppose the force that produced them. In the variable reluctance electric motor 26, the inductance in the stator windings 38 varies dependent upon the position of the rotor 34 relative to the stator windings 38. The inductance in a respective stator winding 38 is greatest when a rotor pole 36 is aligned with the stator pole 32 associated with the respective stator winding 38. As the rotor pole 36 moves away from the stator pole 32 the inductance in the respective stator winding 38 decreases. A minimum value of the inductance occurs at a location where the rotor pole 36 is farthest from the respective stator winding 38. The inductance sensor 46 senses the actual inductance in each stator winding 38 and provides a signal indicative of the actual inductance to the controller 42.

The controller 42 preferably includes a microprocessor (not shown). A lookup table (not shown) is stored in a memory (not shown) associated with the controller 42. The lookup table includes a reference inductance for each stator windings 38 for various rotor positions. The reference inductance is the value of the inductance that is expected for a particular rotor position when the laminations 48 of the rotor 34 are in their intended positions. After receiving the rotor position signal from the rotor position sensor 44, the controller 42 accesses the lookup table and determines a reference inductance for a respective stator winding 38 given the sensed rotor position.

The controller 42 also includes logic for determining if a difference between the reference inductance and the actual inductance exceeds a predetermined amount. The logic determines a difference between the actual inductance signal received from the inductance sensor 46 and the reference inductance. The difference is compared to a predetermined amount. If the difference between the reference inductance and the actual inductance exceeds the predetermined amount, the controller 42 prevents further energization of the stator windings 38 of the variable reluctance electric motor 26.

Preferably, the controller 42 controls the operation of power switches 50 to prevent further energization of the stator windings 38. The power switches 50 are normally open switches that receive power from a power source 52, such as the vehicle battery. When the power switches 50 are closed, power is transferred through the power switches 50 to the appropriate stator windings 38 to operate the variable reluctance electric motor 26. When the difference between the reference inductance and the actual inductance exceeds the predetermined amount, the controller 42 causes the power switches 50 to open preventing further energization of the stator windings 38, and thus, preventing further energization of the variable reluctance electric motor 26.

The present invention prevents energization of the variable reluctance electric motor 26 upon determining that some of the rotor laminations 48 of the rotor 34 have shifted relative to a remainder of the rotor laminations 48. FIG. 3 illustrates a rotor 34 in which a group 54 of laminations 48 has shifted relative to the remainder 56 of the laminations 48. As shown in FIG. 3, the rotor poles 36 no longer extend in a straight axial direction but instead are bifurcated into two angularly misaligned, axially extending sections 36a and 36b.

When a group of rotor laminations shift relative to the remainder of the rotor laminations, the actual inductance in the stator winding 38 differs from the reference inductance. As discussed above, when this difference is greater than the predetermined amount, the controller 42 prevents further energization of the stator windings 38.

Figure 4:
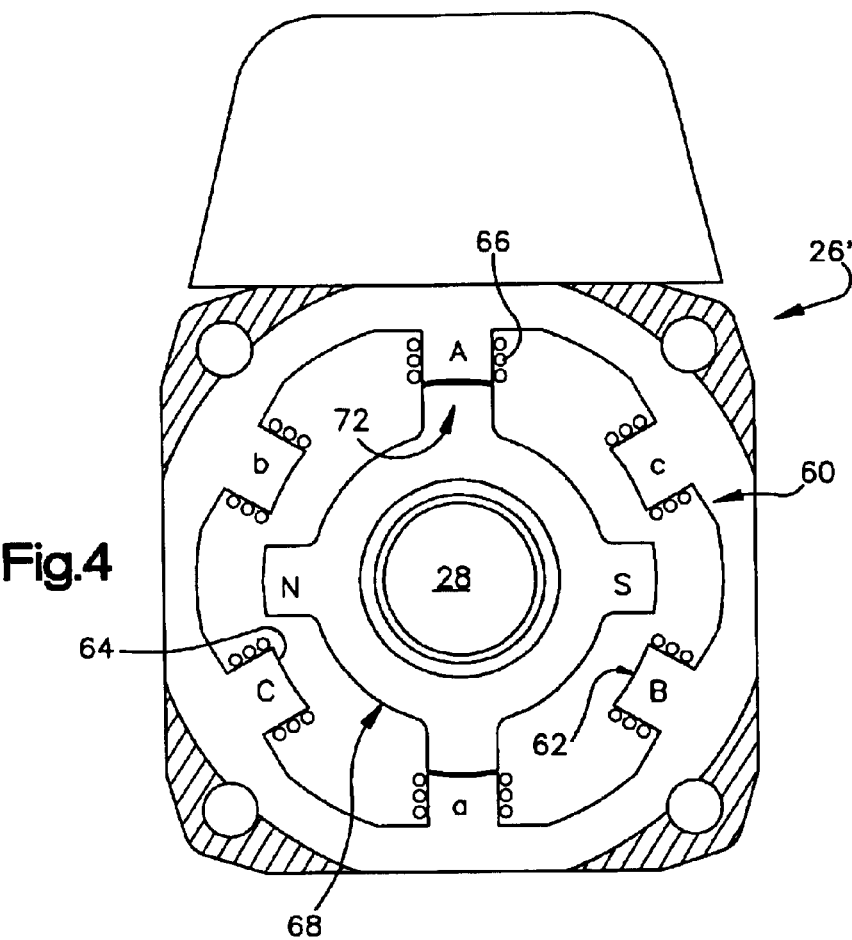
FIG. 4 is a schematic cross-sectional view of an exemplary permanent magnet alternating current electric motor.

FIG. 4 is a schematic cross-sectional view of an exemplary permanent magnet alternating current electric motor 26 that may be used in the electric power-assist steering system 10 of FIG. 1. When the permanent magnet alternating current electric motor 26' is used in the electric power-assist steering system 10 of FIG. 1, the power switches 50 of the electric power-assist steering system 10 include a direct current to alternating current power inverter (not shown) for supplying alternating current to the permanent magnet alternating current electric motor 26'.

In the exemplary embodiment illustrated in FIG. 4, the permanent magnet alternating current electric motor 26' includes a stator 60 with six stator poles, generally indicated at 62. The six stator poles are individually referenced A, B, C, a, b, and c. Each of the six stator poles A, B, C, a, b, and c has a pole face, generally indicated at 64.

Each stator pole 62 has an associated stator winding, indicated generally at 66. When electric current flows through the stator windings 66, the stator pole 62 associated with the stator winding 66 becomes energized. The stator windings 66 are energized in pairs to energize the pairs of stator poles 62. The pairs of stator poles 62 are designated Aa, Bb, and Cc. In a three-phase alternating current electric motor, each pair of stator poles Aa, Bb, and Cc is associated with a respective phase of the three-phase alternating current. The stator windings 66 of each pair of stator poles 62 are so that the pole face 64 of one stator pole 62 of a pair becomes a magnetic north while the pole face 64 of the other stator pole 62 of the pair becomes a magnetic south. For example, when the pair Aa is energized, the polarity of the pole face 64 of stator pole A is opposite to the polarity of the pole face 64 of stator pole a. For example, when the polarity of the pole face 64 of stator pole A is magnetic North, the polarity of the pole face of stator pole a is magnetic South.

Figure 5:
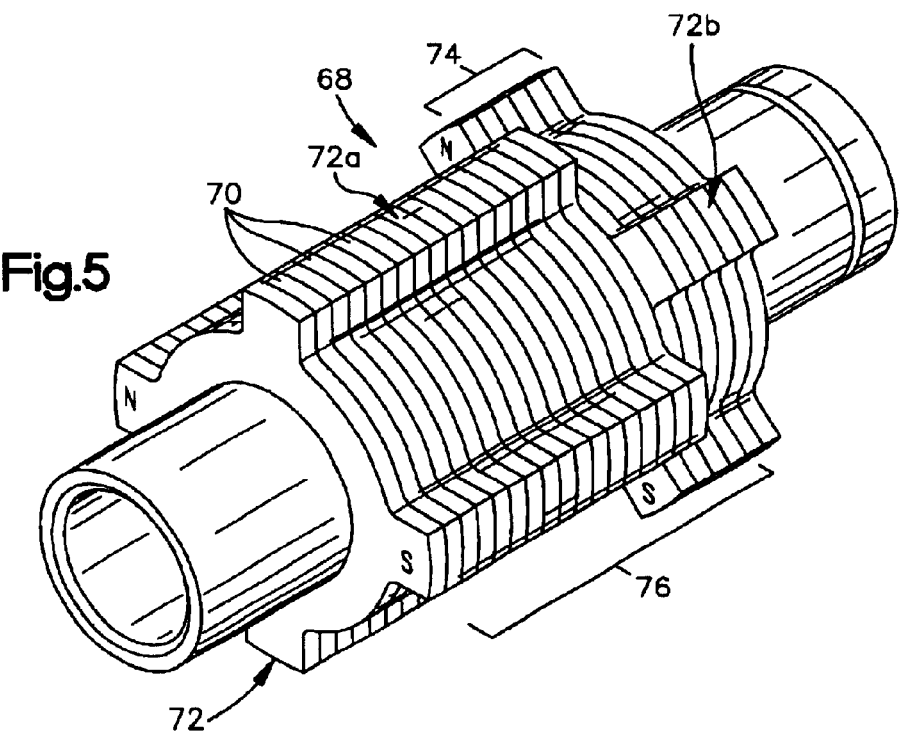
FIG. 5 is a view of a rotor of the permanent magnet alternating current electric motor of FIG. 4 having a group of laminations shifted relative to the remainder of the lamination.

The permanent magnet alternating current electric motor 26' also includes a rotor 68 formed from a series of laminations 70 (FIG. 5). As illustrated, the rotor 68 includes four rotor poles, indicated generally at 72. Portions of the laminations 70 are magnetized so that the rotor 68 includes at least one magnetic north pole, indicated as N, and at least one magnetic south pole, indicates as S.

Each phase of the three-phase alternating current is displaced by one hundred twenty degrees from the other two phases. As the three-phase alternating current is applied to the stator windings 66 of the stator 60, the pole faces 64 become polarized. The three-phase alternating current creates a magnetic field that rotates around the stator 60. For example, assuming that at the time illustrated in FIG. 4, the pole faces 64 associated with stator poles b and C are polarized as magnetic south and the pole faces 64 associated with stator poles B and c are polarized as magnetic north. After a phase shift of sixty degrees in the alternating current, the pole faces 64 associated with stator poles A and b are polarized as magnetic south and the pole faces 64 associated with stator poles a and B are polarized as magnetic north. This phenomenon continues so that the magnetic field rotates clockwise, as viewed in FIG. 4, about the stator 60.

The controller 42 of FIG. 1 controls the direction of rotation of the magnetic field in the stator 60. The direction of rotation of the magnetic field is dependent upon the signal from the position sensor 40. Thus, the controller may cause the magnetic field to rotate counter-clockwise, as viewed in FIG. 4.

The rotor 68 rotates in response to the rotating magnetic field. The magnetic north pole N of the rotor 68 is attracted to the pole faces 64 of the stator 60 that are polarized as magnetic south. Likewise, the magnetic south pole S of the rotor 68 is attracted to the pole faces 64 of the stator 60 that are polarized as magnetic north. As a result, the rotor 68 rotates relative to the stator 60 in response to the rotating magnetic field of the stator 60. For example, with reference to FIG. 4, when the pole faces 64 associated with stator poles A and b are polarized as magnetic south and the pole faces 64 associated with stator poles a and B are polarized as magnetic north, the rotor 68 rotates clockwise from its illustrated position until the magnetic north pole N of the rotor 68 is located equidistance between stator poles A and b and the magnetic south pole S of the rotor 68 is located equidistance between stator poles a and B.

When the permanent magnet alternating current electric motor 26' is used in the electric power-assist steering system 10 of FIG. 1, the inductance sensor 46 senses the actual inductance in each stator winding 66 of the permanent magnet alternating current electric motor 26'. The inductance in the stator windings 66 varies dependent upon the position of the rotor 68 relative to the stator windings 66. The inductance sensor 46 provides a signal indicative of the actual inductance in each stator winding 66 to the controller 42.

The controller 42 includes a lookup table (not shown) having a reference inductance for each of the respective stator windings 66 for various rotor positions. The reference inductance is the value of the inductance expected for a particular rotor position when the laminations 70 of the rotor 68 are in their intended positions. After receiving the rotor position signal from the rotor position sensor 44, the controller 42 accesses the lookup table to determine the reference inductance for the sensed rotor position.

The controller 42 determines a difference between the reference inductance and the actual inductance and compares the difference to a predetermined amount. If the difference between the reference inductance and the actual inductance exceeds the predetermined amount, the controller 42 prevents further energization of the stator windings 66 of the stator 60 of the permanent magnet alternating current electric motor 26'.

The present invention prevents energization of the permanent magnet alternating current electric motor 26' when some of the rotor laminations 70 shift relative to a remainder of the rotor laminations 70. FIG. 5 illustrates a rotor 68 where a group 74 of laminations has shifted relative to the remainder 76 of the laminations 70. As shown in FIG. 5, the rotor poles 72 no longer extend in a straight axial direction but instead are bifurcated into two angularly misaligned, axially extending sections 72a and 72b.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:

an electric motor having a rotor that is rotatable relative to a stator, the rotor being formed from a series of laminations and having a plurality of rotor poles, the stator encircling the rotor and having a plurality of stator poles;

each stator pole having a winding that is energizable to cause rotation of the rotor relative to the stator;

a first sensor for sensing actual inductance in a respective stator winding and for providing a signal indicative of the actual inductance;

a second sensor for sensing a position of the rotor relative to the stator and for providing a rotor position signal; and a controller for receiving the rotor position signal and for receiving the actual inductance signal, the controller determining a reference inductance for the respective stator winding based on the rotor position signal, determining a difference between the actual inductance and the reference inductance, and preventing further energization of the stator windings when the difference between the actual inductance and reference inductance exceeds a predetermined amount.

2. The apparatus of claim 1 further being defined by:

the controller including a look-up table for determining the reference induction from the rotor position signal.

3. The apparatus of claim 2 further being defined by:

the apparatus including power switches that are interposed between the controller and the stator windings;

the power switches opening in response to a signal from the controller to prevent energization of the stator windings.

4. The apparatus of claim 3 further being defined by:

the second sensor being a Hall effect device.

5. The apparatus of claim 1 further being defined by:

the electric motor being a variable reluctance electric motor.

6. The apparatus of claim 1 further being defined by:

the electric motor being a permanent magnet alternating current electric motor.

7. The method of controlling an electric motor having a rotor that is formed from a series of laminations and that has a plurality of rotor poles and having a stator that encircles the rotor and that has a plurality of stator poles, the method comprising the steps of:

sequentially energizing stator windings associated with each stator pole of the plurality of stator poles to cause the rotor to rotate relative to the stator;

sensing actual inductance in a respective stator winding;

sensing a position of the rotor relative to the stator;

determining a reference inductance for the respective stator winding based on the sensed rotor position;

determining a difference between the actual inductance and the reference inductance; and preventing further energization of the stator windings when the difference between the actual inductance and reference inductance exceeds a predetermined amount.

8. The method of claim 7 wherein the step of determining a reference inductance for the respective stator winding based on the sensed rotor position further being defined by the step of:

accessing a look-up table that correlates sensed rotor position and reference inductance; and using the reference inductance that is correlated to the sensed rotor position.

* * * * *